(12) United States Patent
Dhayni (10) Patent No.: US 9,306,788 B2
(45) Date of Patent: Apr. 5, 2016

(54) SFO ESTIMATION TECHNIQUE FOR MIMO-OFDM FREQUENCY SYNCHRONIZATION

(71) Applicant: ST-Ericsson SA, Plan-les-Ouates (CH)

(72) Inventor: Achraf Dhayni, Vallauris (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/416,661

(22) PCT Filed: Jul. 23, 2013

(86) PCT No.: PCT/EP2013/065487
§ 371 (c)(1),
(2) Date: Jan. 23, 2015

(87) PCT Pub. No.: WO2014/032861
PCT Pub. Date: Mar. 6, 2014

(65) Prior Publication Data
US 2015/0188745 A1  Jul. 2, 2015

Related U.S. Application Data

(60) Provisional application No. 61/697,389, filed on Sep. 6, 2012.

(30) Foreign Application Priority Data

Aug. 27, 2012  (EP) ..................................... 12306024
Jul. 5, 2013    (EP) ..................................... 13305957

(51) Int. Cl.
*H04L 27/06* (2006.01)
*H04L 27/26* (2006.01)
(Continued)

(52) U.S. Cl.
CPC .......... *H04L 27/2657* (2013.01); *H04B 7/0413* (2013.01); *H04B 17/104* (2015.01); *H04L 27/2627* (2013.01); *H04L 27/2655* (2013.01)

(58) Field of Classification Search
CPC ............ H04L 27/2657; H04L 27/2675; H04L 5/0048; H04L 2027/003; H04L 25/022; H04L 27/2613
USPC ......... 375/226, 260, 267, 316, 324, 326, 340, 375/344, 347
See application file for complete search history.

(56) References Cited

U.S. PATENT DOCUMENTS

2006/0039491 A1*  2/2006  Han ............................. 375/260
2008/0043711 A1*  2/2008  Hart et al. ..................... 370/348
(Continued)

OTHER PUBLICATIONS

International Search Report issued in corresponding International application No. PCT/EP2013/065487, date of mailing Nov. 4, 2013.
(Continued)

*Primary Examiner* — Freshteh N Aghdam
(74) *Attorney, Agent, or Firm* — Patent Portfolio Builders PLLC (57) ABSTRACT

A receiver is configured to determine an estimation of a Sampling Frequency Offset an OFDM signal received from an emitter over a transmission channel. The received OFDM signal is constituted of symbols. The receiver receives symbols from the emitter through a first path of said transmission channel, and receives the symbols from the emitter through a second path of the transmission channel. On the second path, the symbols are characterized by a different ratio between a first duration of a total OFDM symbol and a second duration of useful data portion of the OFDM symbol, than on the first path. The receiver determines the estimation according to received symbols through the first and second paths.

17 Claims, 3 Drawing Sheets

(51) Int. Cl.
*H04B 17/10* (2015.01)
*H04B 7/04* (2006.01)

(56) References Cited

U.S. PATENT DOCUMENTS

2009/0190675 A1* 7/2009 Ling et al. ............... 375/260
2009/0190686 A1* 7/2009 Cheong et al. ........... 375/267
2009/0203377 A1* 8/2009 Kawasaki ............... 455/435.1
2011/0044408 A1* 2/2011 Ahmad .................... 375/340

OTHER PUBLICATIONS

Extended European Search Report issued in corresponding European application No. EP 13 30 5957, date of completion of the search Oct. 22, 2013.
Terry, John, "OFDM Wireless LANs: A Theoretical and Practical Guide," SAMS Publishing, USA, pp. 62-66, XP002714997, Sep. 1, 2002.

* cited by examiner

Fig. 1a

(Background Art)

Fig. 1b

(Background Art)

SFO ESTIMATION TECHNIQUE FOR MIMO-OFDM FREQUENCY SYNCHRONIZATION

FIELD OF THE INVENTION

The invention relates to the field of multicarrier communication systems and more particularly to Orthogonal Frequency-Division Multiplexing (OFDM) systems, including wireless OFDM systems.

BACKGROUND OF THE INVENTION

In telecommunication and wireless transceivers, the oscillators used to generate the digital to analog converter (DAC) and analog to digital convertor (ADC) sampling instants at the transmitter and receiver cannot have exactly the same period. Consequently, the sampling instants slowly shift, relatively to each other.

This phenomenon is usually known and referred to as SFO (Sampling Frequency Offset), and has been addressed, including regarding OFDM communication systems. This sampling clock error, or SFO, has two main effects:
  A slow shift of the symbol timing point, which rotates subcarriers, and,
  A loss of SNR (Signal to Noise Ratio) due to the intercarrier interference (ICI) generated by the slightly incorrect sampling instants, which in turn causes loss of the orthogonality of the subcarriers.

Figure 1A:
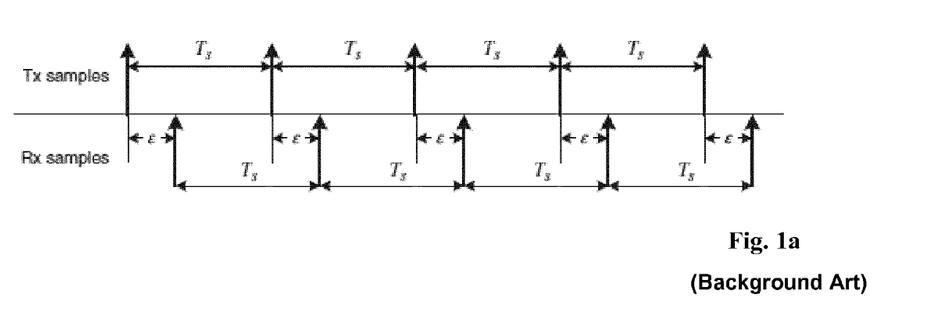
FIGS. 1a and 1b, already commented, depict undesirable effects due to synchronization issues between receiver and transmitter.
Figure 1B:
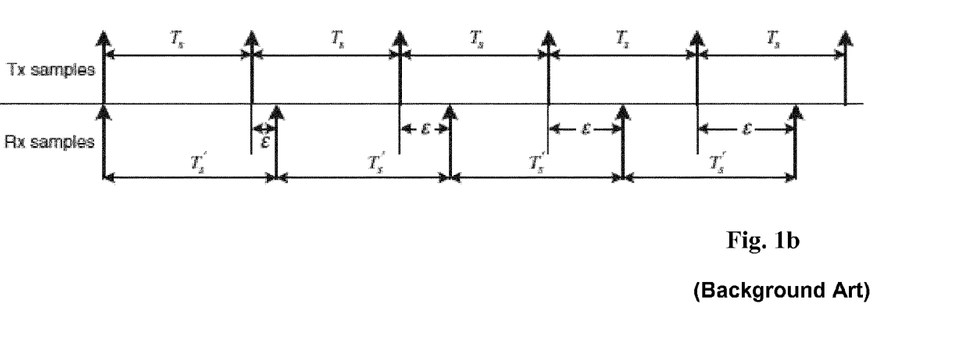

The FIGS. 1a and 1b depict more clearly undesirable effects due to synchronization issues between receiver and transmitter.

The FIG. 1a shows a phase difference between the DAC and ADC sampling frequencies of, respectively, the transmitter Tx and the receiver Rx.

The period $T_s$ between 2 subsequent samples remains constant and equal at transmitter Tx side and receiver Rx side, but a phase difference $\epsilon$ shifts forward the samples at receiver side. This leads to STO (Sample Time Offset), which can be easily compensated.

The FIG. 1b shows the problem caused by SFO (Sample Frequency Offset), mentioned above. This time, the period $T_s'$ between 2 received samples at receiver side is different (here, longer) than the period $T_s$ of the transmitted samples. Therefore, at each sample, the received sample is shifted by an increasing time $\epsilon$.

After a certain number of samples, a sample will be missed. This would lead to the impossibility to decode the corresponding OFDM symbol.

Also, after a certain number of samples less than the total number of samples per OFDM symbol, the ADC will fall on a sample of the next OFDM symbol. This situation leads to Inter-Symbol Interference (ISI), which turn leads to the loss of orthogonality of the subcarriers and dramatically decrease of the signal to noise ratio (SNR).

Similar problems happen when the ADC sampling frequency is greater than the DAC sampling frequency: samples will be repeated instead of being missed, but the consequence remains impossibility to decode some OFDM symbols and a decrease of the signal to noise ratio (SNR).

This SFO-related problem is partially solved by using pilot signal.

Pilot-based techniques are employed in the frequency domain, i.e. after the DFT (Discrete Fourier Transform) block of the OFDM receiver chain.

The SFO is measured by the normalized sampling error given as follows:

$$t_\Delta = \frac{T' - T}{T}$$

Where T and T' are, respectively, the transmitter and receiver sampling periods.

Then, the overall effect after DFT on the received subcarriers $R_{l,k}$ is as follows:

$$R_{l,k} = e^{j2\pi k \, t_\Delta \, l} \frac{T_s}{T_u} X_{l,k} \cdot sinc(\pi k t) \cdot H_{l,k} + W_{l,k} + N_{t_\Delta}(l, k) \quad (1)$$

Where l is the OFDM symbol index, k is the subcarrier index, $T_s$ and $T_u$ are the durations of the total OFDM symbol and of the useful data portion, respectively, $H_{l,k}$ is the transfer function associated with the transmission channel between the emitter and the receiver, $W_{l,k}$ is the additive white noise And $N_{t_\Delta}(l,k)$ is the additional interference due to the sampling frequency offset. The power of this last term can be approximated by:

$$P_{t_\Delta} \approx \frac{\pi^2}{3} (^k t_\Delta)^2$$

Therefore, the degradation grows as the square of the product of the offset $t_\Delta$ and the subcarrier index k. This means that the outermost subcarriers are most severely impacted. The degradation can also be expressed directly as SNR loss in decibels. The following approximation is derived:

$$D_n \approx \log_{10}\left(1 + \frac{\pi^2}{3} \frac{E_s}{N_0} (kt_\Delta)^2\right)$$

WLAN OFDM systems typically have relatively small number of subcarriers and quite small offset $t_\Delta$. Hence, $kt_\Delta \ll 1$, so that the interference caused by sampling frequency offset can usually be ignored.

The equation (1) also shows the most significant problem caused by the offset, namely the term $$e^{j2\pi k \, t_\Delta \, l} \frac{T_s}{T_u},$$

which represents the phase error due to SFO.

As discussed above, in WLAN, we only care about correcting the phase error induced by the SFO. This is done by relying on the pilots to estimate their phase difference according to the following:

The sampling frequency offset (SFO) is estimated by using the knowledge of the linear relationship between the phase rotation caused by the offset and the pilot subcarrier index. The received pilot subcarriers, in a simplified form, are:

$$R_{l,k} = H_k P_{l,k} e^{j2\pi k \, t_\Delta \, l \frac{T_s}{T_u}} \quad (2)$$

Let $Z_{l,k}=R_{l,k}R^*_{l-1,k}$
This implies:

$$Z_{l,k} = H_k P_{l,k} e^{j2\pi k \, t_\Delta \, l \frac{T_s}{T_u}} \left( H_k P_{l-1,k} e^{j2\pi k \, t_\Delta \, l \frac{T_s}{T_u}} \right)^* \quad (3)$$

$$Z_{l,k} = |H_k|^2 |P_{l,k}|^2 e^{j2\pi k \, t_\Delta \, l \frac{T_s}{T_u}} e^{-j2\pi k \, t_\Delta \, (l-1) \frac{T_s}{T_u}}$$

$$Z_{l,k} = |H_k|^2 |P_{l,k}|^2 e^{j2\pi k \, t_\Delta \, l \frac{T_s}{T_u}}$$

According to the above equation, we can see that $Z_{l,k}$ is the multiplication of a pilot of the $l^{th}$ received OFDM symbol (after the DFT) by the complex conjugate of the same pilot of the previous OFDM symbol.

Finding the phase of $Z_{l,k}$ is equivalent to finding the phase error caused by the SFO (which is the error that we care about in WLAN, as mentioned before).

From the above question (3), an estimation $\hat{t}_\Delta$ of the SFO $t_\Delta$ can be found by the following equation:

$$\hat{t}_\Delta = \frac{T_u}{2\pi k l T_s} \arg(Z_{l,k})$$

For better estimation accuracy, since we have more than 1 pilot per OFDM symbol, the above estimation can be applied between the negative and positive pilots of the same received OFDM.

$$\hat{t}_\Delta = \frac{1}{2\pi} \frac{T_u}{T_s} \frac{1}{\min_{k \in C_2}(k) + \max_{k \in C_2}(k)} (\phi_{2,l} - \phi_{1,l})$$

Where:

$$\phi_{1,l} = \angle \left[ \sum_{k \in C_1} Z_{l,k} \right]$$

And $$\phi_{2,l} = \angle \left[ \sum_{k \in C_2} Z_{l,k} \right]$$

And where C1 and C2 are the sets of pilots at negative and positive subcarriers respectively. In the case or WLAN 802.11 a/g, C1=[−21, −7], C2=[7, 21], $\min_{k \in C_2}$=7, and $\max_{k \in C_2}$=21.

The correction can then be done by different approaches.

Figure 2A:
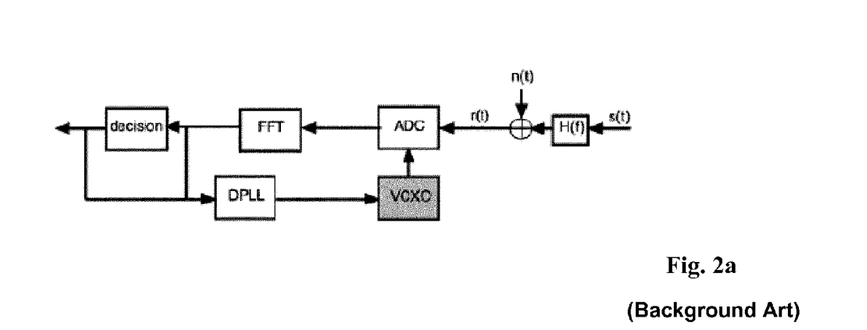
FIGS. 2a and 2b, already commented, depict implementation of the SFO compensation by correcting the clock frequency of the ADC.
Figure 2B:
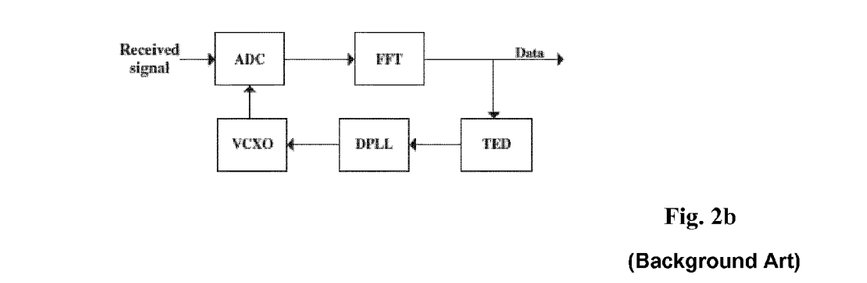

A first approach consists in correcting the clock frequency of the ADC like depicted in FIGS. 2a and 2b.

The decision block of FIG. 2a or the timing error detector block (TED) of FIG. 2b estimates the SFO $t_\Delta$ as explained above.

Figure 3A:
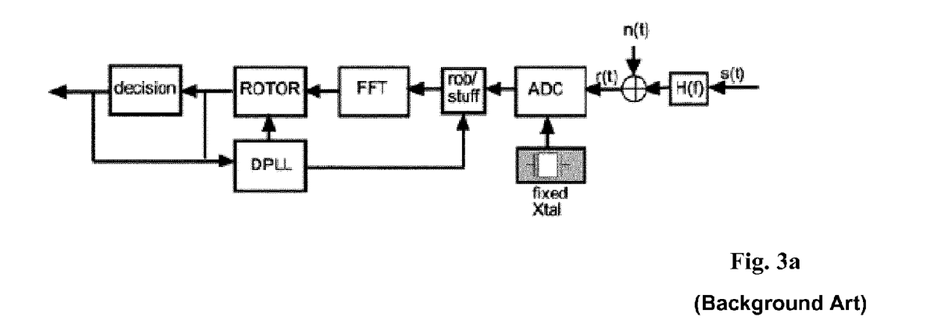
FIGS. 3a and 3b, already commented, depict implementation of the SFO compensation by performing an inverse rotation of the subcarriers after the DFT.
Figure 3B:
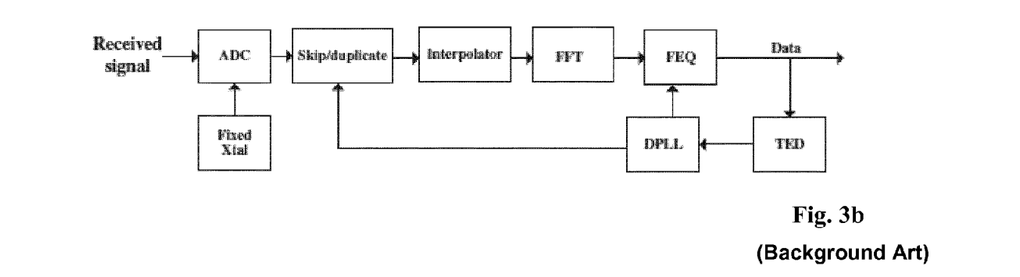

A second approach is illustrated by FIGS. 3a and 3b, and consists in performing an inverse rotation of the subcarriers after the DFT. This is done by the ROTOR block in FIG. 3a, which is piloted by the Decision block which estimates the SFO $t_\Delta$ as explained above.

FIG. 3b shows a non-synchronous sampling system where the sampling rate is fixed and the sampling time offset is compensated by using digital devices such as an FIR interpolating filter. Since it does not require a feedback signal for adjusting the sampling frequency (at ADC), it is simpler to implement then the synchronous sampling systems. However, the nonsynchronous sampling scheme is more vulnerable to SFO if it is not compensated properly. Since a sample can be inserted or lost in one OFDM symbol when SFO is present, the nonsynchronous sampling scheme performs the operations of skip/duplication/interpolation before the FFT operation and compensates for the effect of phase rotation by using FEQ (Frequency-domain Equalizer).

As these approaches are not fully satisfactory, there is a need to improve the situation and to propose a new and alternative approach.

SUMMARY OF THE INVENTION

This is achieved with a method for determining an estimation of a Sampling Frequency Offset of an OFDM signal sent by an emitter to a receiver over a transmission channel, said signal being constituted of symbols; said method comprising:
sending symbols by said emitter through a first path of said transmission channel;
sending said symbols by said emitter through a second path of said transmission channel; said second path having a different ratio between the durations of a total OFDM symbol and a useful data portion of it;
determining said estimation according to received symbols through said first and second paths.

According to embodiments of the invention, the method may comprise one or several of the following features, taken alone or in partial or full combinations:
said estimation is determined according to the equation $$\hat{t}_\Delta = \frac{1}{2\pi k(1-c) \cdot \left( \frac{T_s}{T_u} \right)_{p1}} \cdot \arg\left( \frac{R'_{l,k,p1}}{R'_{l,k,p2}} \right),$$

wherein $R_{l,k,p1}$ and $R_{l,k,p2}$ corresponds to said received symbols from, respectively said first path and said second path, and wherein Ts and Tu are said durations of a total OFDM symbol and a useful data portion of it, respectively, k represents the subcarrier, and c is a parameter.
said estimation is determined as an average value taken for all the pilot subcarriers k
said estimation is determined as an average value taken for all the subcarriers
said duration of a total OFDM symbol is equal to 4 µs for said first path and said second path, and said duration of a useful data portion differs between said first path and said second path, so that $(T_s/T_u)_{p1} = c^*(T_s/T_u)_{p2}$.
said parameter (c) is transmitted by said emitter (EMT) inside preamble symbols of said OFDM signal.

Another aspect of the invention relates to a method for receiving an OFDM signal consisting in determining an estimation of a Sampling Frequency Offset as previously described and compensating for said Sampling Frequency Offset of said OFDM signal according to said estimation.

Another aspect of the invention relates to a computer program comprising program instructions and being loadable into a data processing unit and adapted to cause execution of the method previously described when the computer program is run by the data processing unit.

Still Another aspect of the invention relates to a receiver adapted for determining an estimation of a Sampling Frequency Offset an OFDM signal received from an emitter over a transmission channel, said signal being constituted of symbols; said receiver comprising means for:

receiving symbols from said emitter through a first path of said transmission channel;

receiving said symbols from said emitter through a second path of said transmission channel; said second path having a different ratio between the durations of a total OFDM symbol and a useful data portion of it;

determining said estimation according to received symbols through said first and second paths.

According to embodiments of the invention, the method may comprise one or several of the following features, taken alone or in partial or full combinations:

said means are determining said estimation according to the equation $$\hat{t}_\Delta = \frac{1}{2\pi k(1-c) \cdot \left(\frac{T_s}{T_u}\right)_{p1}} \cdot \arg\left(\frac{R'_{l,k,p1}}{R'_{l,k,p2}}\right),$$

wherein $R_{l,k,p1}$ and $R_{l,k,p2}$ corresponds to said received symbols from, respectively said first path and said second path, and wherein Ts and Tu are said durations of a total OFDM symbol and a useful data portion of it, respectively, k represents the subcarrier, and c is a parameter.

said estimation is determined as an average value taken for all the pilot subcarriers k said estimation is determined as an average value taken for all the subcarriers said duration of a total OFDM symbol is equal to 4 μs for said first path and said second path, and said duration of a useful data portion differs between said first path and said second path, so that $(T_s/T_u)_{p1}=c^*(T_s/T_u)_{p2}$.

said parameter is received from said emitter inside preamble symbols of said OFDM signal.

Another aspect of the invention relates to a receiver adapted for determining an estimation of a Sampling Frequency Offset as previously described and for compensating for said Sampling Frequency Offset of said OFDM signal according to said estimation.

Further features and advantages will appear from the following description of some embodiments of the invention, given as non-limiting examples, with reference to the accompanying drawings listed hereunder.

DETAILED DESCRIPTION OF EMBODIMENTS OF THE INVENTION

Figure 4:
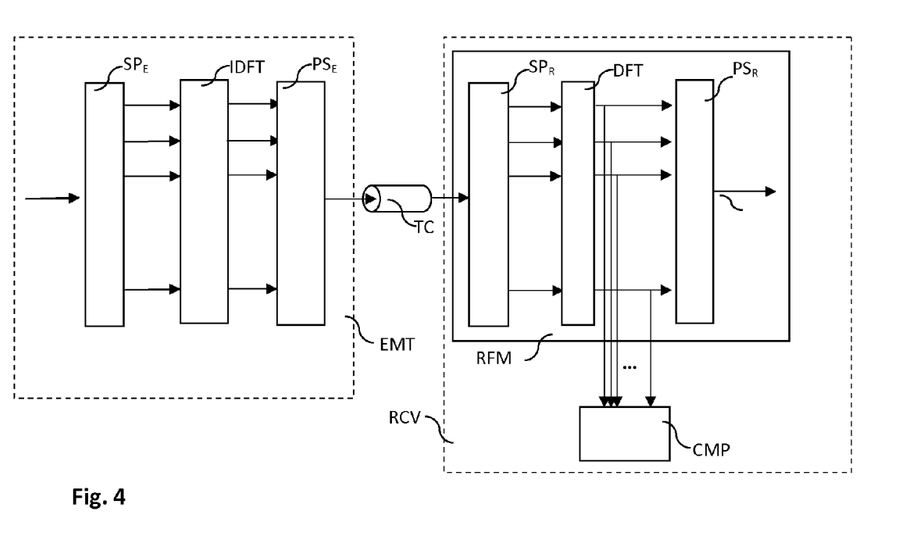
FIG. 4 illustrates a simplified and high-level block diagram of an OFDM system according to embodiments of the invention.

FIG. 1 illustrates a simplified and high-level block diagram of an OFDM system comprising an emitter EMT and a receiver RCV connected by a communication channel TC. This communication channel is usually (but not necessarily) wireless and perturbed by noise.

The principle of this OFDM system consists in transmitting several symbols (or signal) in parallel by assigning to each of them a different carrier, each carrier being orthogonal to the others. The number of carriers (or subcarriers) depends on the total bandwidth and on the duration of a symbol (i.e. the size of the time window in which the receiver can capture the transmitted symbols).

The symbols to be transmitted, initially in the frequency domain, are transposed into the time domain and modulated for transmission over the communication channel TC. The receiver RCV transposes the received signals back to the frequency domain to extract the transmitted symbols.

More precisely, the symbols to be transmitted at emitter EMT side are first appropriately encoded and then sent to a serial-to-parallel transformer $SP_E$. This function blocks aims in extracting from a symbol, a number N of individual values $X_l[k]$, where "k" ranges from 1 to N−1 and "l" represents the ordinal number of the OFDM symbol to be transmitted.

This number N is equal to the number of subcarriers used for the transmission over the communication channel TC. It depends on the standard. For instance according to WLAN 802.11a, 52 subcarriers are used (48 data subcarriers+4 pilot subcarriers), and 12 (6 on the "left" and 6 on the "right") subcarriers are not used (zero subcarriers). Here and in the following descriptions, the variable k will be used for the frequency domain and the variable n for time domain.

The symbols $X_l[k]$ which are outputted by the serial-to-parallel transformer $SP_E$ are provided to a frequency-to-time conversion module IDFT. This frequency-to-time convertor can perform an inverse discrete Fourier Transform of the symbols to generate symbols $x_l[n]$ in the time domain. It is often implemented by an inverse Fast Fourier Transform (I-FFT).

These symbols are then multiplexed by the parallel-to-serial transformer $PS_E$ to produce a signal transmitted over the transmission channel TC.

The transmission channel is modeled in the frequency domain by its associated transfer function $H_l(k)$. It is modeled in the time domain by its impulse response $h_l(n)$. $H_l(k)$ is the Fourier transform of $h_l(n)$.

The transfer function represents the channel multipath behavior, delay, and complex attenuation. The transfer function may vary over time and is therefore indexed by the number of the transmitted symbol.

The multiplexer $PS_E$ modulates the orthogonal subcarriers by the symbols to be transmitted.

The transmitted OFDM symbol signal spectrum is the sum in the frequency domain of the orthogonal subcarrier sinc functions that are superposed over each other. The individual symbols can be independently modulated by using different types of modulations techniques, like for instance QAM (Quadrature Amplitude Modulation) or PSK (Phase-Shift Keying).

The symbols are then received by the receiver RCV. The received symbols are functions of the emitted symbols and of the transfer function $H_k$ of the transmission channel, and of noise perturbing this channel.

The receiver RCV comprises a receiving function module RFM which generates demodulated symbols from the received symbols stream. The demodulated symbols can then be passed over to other circuitry of the receiver RCV (not depicted).

The receiving function module RFM may perform different steps which are usual in OFDM systems but may be subject to variations and different implementations.

The high-level schema of the FIG. 1 shows a possible implementation where the receiving function module RFM comprises:

- a serial-to-parallel transformer or demultiplexer $SP_R$, which parallelizes the received symbol to a set of time symbols.
- A time-to-frequency conversion module DFT. This convertor can perform a discrete Fourier Transform of the time symbols to generate received symbols as a set of received frequency bins in the frequency domain, corresponding to determined subcarriers.
- A parallel-to-serial transformer $PS_R$ to produce symbols made of these received frequency bins. These symbols can then be transmitted to other circuitries of the receiver RCV (not depicted in the figure).

In order to perform these steps, the receiving function module RFM shares with the emitter EMT the same subcarriers frequencies, as well as the number of subcarriers N. They could have been communicated beforehand, or they may be set or tuned previously in both the emitter and receiver, for instance according to standards specifications.

However, the received symbols may have been perturbed during the transmission over the transmission channel TC. They can be received with potential CFO and STO. No information can be determined by the receiver RCV about the nature of the transmission channel to help valuing the STO. In other words, at the moment of STO estimation, we do not have information about the transfer function of the channel. Therefore, the receiver RCV should rely on blind determination techniques to compensate for the effects of the Symbol Time Offset (STO).

The present invention is particularly useful in 4$^{th}$ generation and LTE (Long-Term Evolution) OFDM-MIMO systems where spatial multiplexing is employed.

This technique is based on digital signal processing in the frequency domain, i.e. after the time-to-frequency conversion block, DFT, of the receiver RCV) and after equalization (i.e. after channel estimation and equalization blocks in the Rx chain). The technique has the advantages of being not necessarily pilot-based, applicable at each received subcarriers (i.e. applicable in the tracking phase of SFO estimation), of better estimation precision versus SNR-based approaches and has an easy implementation.

Figure 5:
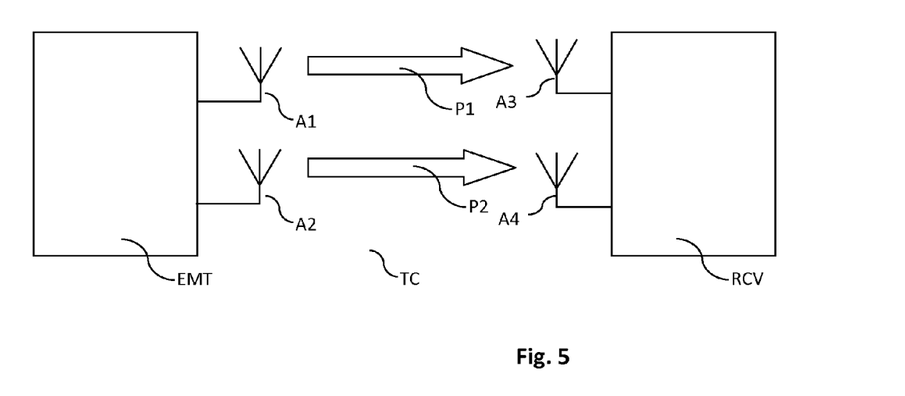
FIG. 5 shows OFDM emitter and an OFDM receiver communicating through two communication paths.

FIG. 5 shows a MIMO-OFDM system where spatial multiplexing exists. MIMO stands for Multiple Input-Multiple Outputs and refers to a transmission channel TC between a emitter EMT having several antennas A1, A2 and a receiver RCV having also several antennas A3, A4. Consequently, the transmission channel TC has several paths, p1, p2, between the emitter and the receiver.

This allows increasing the channel capacity thanks to this transmitter diversity.

According to the invention, the emitter EMT sends the same symbols through a first path p1 and through a second path p2. It can possibly send the same symbols through additional paths also, but the rest of the description will be based on a 2-path embodiment.

The two paths p1, p2 have different ratios between the duration Ts of a total OFDM symbol and the duration Tu of the useful data portion.

We can then write $(T_s/T_u)_{p1}=c*(T_s/T_u)_{p2}$, where c is a parameter.

In the case of WLAN OFDM system, compliant with IEEE 802 a/g standards, the duration of a total OFDM symbol is set at 4 μs. Thus, the duration of the useful data portion Tu differs between the first and the second paths, so that $(T_s/T_u)_{p1}=c*(T_s/T_u)_{p2}$, wherein:

- $(Ts/Tu)_{p1}$ is the ratio between the duration Ts of a total OFDM symbol and the duration Tu of the useful data portion for the first path, p1, and
- $(Ts/Tu)_{p2}$ is the ratio between the duration Ts of a total OFDM symbol and the duration Tu of the useful data portion for the second path p2.

As shown in the FIG. 4, the receiver RCV has the appropriate means for receiving these symbols through first and second paths, e.g. thanks to the receiving function module RFM.

The receiver RCV has also means, e.g. the computing module CMP, for determining an estimation of the Sampling Frequency Offset (SFO) of the received signals according to these received symbols through first and second paths.

More precisely, this determination is performed from the received symbols in the frequency domain (thus, after the time-to-frequency conversion block DFT) and after equalization. As it will be demonstrated below, by taking into account the received signal from two different paths (at least), some unknowns can be removed so that it is possible for the receiver RCV to determine an accurate estimation for the SFO: this estimation becomes then a function of the argument (i.e. the phase) of the ratio of the received symbols through a path by the received symbols of the other path. This estimation can be done for a given subcarrier k or averaged along several or all subcarriers of the OFDM signal.

In other words, after equalizing, through dividing a subcarrier k received via the first path p1 by the same subcarrier k received via the second path p2, the phase of the outcome of the division can be used to estimate the SFO $t_\Delta$ similarly as the phase of $Z_{l,k}$ in equation (3) is used today to estimate $t_\Delta$.

This is proved through the equations below, which reuse the previously-described equation (2) for the received subcarriers via the first path p1:

$$R_{l,k,p1} = H_{k,p1} T_{l,k} \cdot e^{j2\pi k t_\Delta} \left(\frac{T_s}{T_u}\right)_{p1} \quad \text{(eq. A)}$$

Where $T_{l,k}$ is the k$^{th}$ subcarrier of the transmitted OFDM symbol number 1. $H_{k,p1}$ is the transfer function of the first path p1 of the transmission channel at the k$^{th}$ subcarrier frequency.

On the other hand, the received subcarriers via path2 are expressed as:

$$R_{l,k,p2} = H_{k,p2} T_{l,k} \cdot e^{j2\pi k t_\Delta} \left(\frac{T_s}{T_u}\right)_{p2} \quad \text{(eq. B)}$$

Where $T_{l,k}$ is the k$^{th}$ subcarrier of the transmitted OFDM symbol number 1 and $H_{k,p2}$ is the transfer function of the second path p2 of the transmission channel at the k$^{th}$ subcarrier frequency.

As we explained above, we need to satisfy the following equation:

$$(T_s/T_u)_{p1}=c*(T_s/T_u)_{p2} \quad \text{(eq. C)}$$

And the signal processing is applied after channel estimation and equalization: we note $R'_{l,k,p1}$ and $R'_{l,k,p2}$ the received symbols from paths p1 and p2 respectively, after equalization.

After equalization, $H_{k,p1}$ and $H_{k,p2}$ are equalized and the received subcarriers of equation A and B become as follows:

$$R'_{l,k,p1} = T_{l,k} \cdot e^{j2\pi k t_\Delta} \left(\frac{T_s}{T_u}\right)_{p1} \quad \text{(eq. D)}$$

$$R'_{l,k,p2} = T_{l,k} \cdot e^{j2\pi k t_\Delta} \left(\frac{T_s}{T_u}\right)_{p2} \quad \text{(eq. E)}$$

By dividing equation D by equation E, and using equation C, we get:

$$\frac{R'_{l,k,p1}}{R'_{l,k,p2}} = e^{j2\pi k t_\Delta (1-c) \cdot \left(\frac{T_s}{T_u}\right)_{p1}}$$

This implies that the estimation $\hat{t}_\Delta$ for the SFO $t_\Delta$ is as follows:

$$\hat{t}_\Delta = \frac{1}{2\pi k (1-c) \cdot \left(\frac{T_s}{T_u}\right)_{p1}} \cdot \arg\left(\frac{R'_{l,k,p1}}{R'_{l,k,p2}}\right) \quad \text{(eq. F)}$$

This estimation is performed here for a single subcarrier k. For better estimation accuracy, it is possible to determine this estimation as an average value taken for several subcarriers, e.g. for all the pilot subcarriers.

For better estimation accuracy, it is also possible to determine the estimation in equation F by taking an average value of all the subcarriers. In this embodiment, we finally get:

$$\hat{t}_\Delta = \frac{1}{N} \sum_k \frac{1}{2\pi k (1-c) \cdot \left(\frac{T_s}{T_u}\right)_{p1}} \cdot \arg\left(\frac{R'_{l,k,p1}}{R'_{l,k,p2}}\right) \quad \text{(eq. G)}$$

N is the total number of subcarriers. N=52 in the case of WLAN 802.11 a/g.

Averaging the estimates over all the subcarriers has the further advantage of providing much more immunity to noise than averaging the estimates over all the pilot subcarriers. This is because the total number of subcarriers is much greater than the number of pilot subcarriers. This gives our technique superiority in terms of estimation precision versus signal-to-noise ratio (SNR) based approaches.

This parameter c can be known by the receiver RCV by different ways.

It can be a hard-coded value, stored inside the emitter and inside the receiver during fabrication or configuration.

It can also be a value sent by the emitter during the transmission of the preamble symbols of the OFDM signal.

According to an embodiment of the invention, for each subcarrier k, the arg function in Equation G can be implemented using a cordic that calculates the $\tan^{-1}$ function of the division of the equalized path1 and path2 versions of the same transmitted subcarrier.

The result at the output of the cordic is then multiplied by $$\frac{1}{2\pi k (1-c) \cdot \left(\frac{T_s}{T_u}\right)_{p1}}$$

After the multiplication, the results corresponding to all subcarriers are summed together and divided by N.

The estimated SFO can then be corrected and compensated according to methods and functional architectures known in the art, e.g. like those explained above.

This solution presents numerous advantages over prior approaches, including:
  The implementation is easy.
  It has a better spectral efficiency since it is independent of pilot subcarriers.
  When compared to all other SFO estimation techniques, simulation results proved that this technique has a better precision versus SNR.

The invention has been described with reference to preferred embodiments. However, many variations are possible within the scope of the invention.

The invention claimed is:

1. A method for determining an estimation of a Sampling Frequency Offset of an Orthogonal Frequency-Division Multiplexing, OFDM, signal sent by an emitter to a receiver over a transmission channel, said signal being constituted of symbols, said method comprising:
   sending symbols by said emitter through a first path of said transmission channel;
   sending said symbols by said emitter through a second path of said transmission channel, said second path being characterized by a different ratio than the first path, between a first duration of a total OFDM symbol and a second duration of a useful data portion of the total OFDM symbol;
   determining said estimation according to the symbols received through said first and second paths; and compensating for said Sampling Frequency Offset of said OFDM signal according to said estimation.

2. The method according to claim 1, wherein said estimation $\hat{t}_\Delta$ is determined as $$\hat{t}_\Delta = \frac{1}{2\pi k (1-c) \cdot \left(\frac{T_s}{T_u}\right)_{p1}} \cdot \arg\left(\frac{R'_{l,k,p1}}{R'_{l,k,p2}}\right),$$

wherein $R_{l,k,p1}$ and $R_{l,k,p2}$ corresponds to said received symbols from, respectively said first path p1 and said second path p2, and wherein Ts and Tu are said first duration and said second duration, respectively, k represents a subcarrier, and c is a parameter.

3. The method according to claim 1, wherein said estimation is determined as an average value taken for all pilot subcarriers.

4. The method according to claim 1, wherein said estimation is determined as an average value taken for all subcarriers.

5. The method according to claim 1 wherein said first duration is equal to 4 μs for said first path, p1, and for said second path, p2, and said second duration differs between said first path and said second path, so that $(T_s/T_u)_{p1} = c*(T_s/T_u)_{p2}$, where c is a parameter.

6. The method according to claim 2, wherein said parameter is transmitted by said emitter inside preamble symbols of said OFDM signal.

7. A receiver for determining an estimation of a Sampling Frequency Offset an Orthogonal Frequency-Division Multiplexing (OFDM) signal received from an emitter over a transmission channel, said signal being constituted of symbols, said receiver comprising:
   means for receiving symbols from said emitter through a first path of said transmission channel and receiving said symbols from said emitter through a second path of said transmission channel, said second path being characterized by a different ratio between the durations of a total OFDM symbol and a useful data portion of the total OFDM symbol, than the first path;

means for determining said estimation based on said symbols received through said first path and through said second path; and means for compensating for said Sampling Frequency Offset of said OFDM signal according to said estimation.

8. The receiver according to claim 7, wherein said means for determining said estimation $\hat{t}_\Delta$ is determined as:

$$\hat{t}_\Delta = \frac{1}{2\pi k(1-c) \cdot \left(\frac{T_s}{T_u}\right)_{p1}} \cdot \arg\left(\frac{R'_{l,k,p1}}{R'_{l,k,p2}}\right),$$

wherein $R_{l,k,p1}$ and $R_{l,k,p2}$ corresponds to said received symbols from, respectively said first path and said second path, and wherein Ts and Tu are said first duration and said second duration, respectively, k represents subcarrier, and c is a parameter.

9. The receiver according to claim 7, wherein said estimation is determined as an average value taken for all pilot subcarriers.

10. The receiver according to claim 7, wherein said estimation is determined as an average value taken for all subcarriers.

11. The receiver according to claim 7, wherein said first duration is equal to 4 μs for said first path and said second path, and said second duration differs between said first path and said second path, so that $(T_s/T_u)_{p1} = c^*(T_s/T_u)_{p2}$.

12. The receiver according to claim 8, wherein said parameter is received from said emitter inside preamble symbols of said OFDM signal.

13. A method performed by a receiver, for determining an estimation of a Sampling Frequency Offset of an Orthogonal Frequency-Division Multiplexing, OFDM, signal including symbols, said method comprising:

receiving said symbols sent via a first path of a transmission channel;

receiving said symbols sent via a second path of said transmission channel, said second path being characterized by a different ratio than the first path, between a first duration of a total OFDM symbol and a second duration of a useful data portion of the total OFDM symbol;

determining said estimation according to the symbols received through said first and second paths; and compensating for said Sampling Frequency Offset of said OFDM signal according to said estimation.

14. The method according to claim 13, wherein said estimation $\hat{t}_\Delta$ is determined as $$\hat{t}_\Delta = \frac{1}{2\pi k(1-c) \cdot \left(\frac{T_s}{T_u}\right)_{p1}} \cdot \arg\left(\frac{R'_{l,k,p1}}{R'_{l,k,p2}}\right),$$

wherein $R_{l,k,p1}$ and $R_{l,k,p2}$ corresponds to said received symbols from, respectively said first path p1 and said second path p2, and wherein Ts and Tu are said first duration and said second duration, respectively, k represents a subcarrier, and c is a parameter.

15. The method according to claim 13, wherein said estimation is determined as an average value taken for all pilot subcarriers, or said estimation is determined as an average value taken for all subcarriers.

16. The method according to claim 13, wherein said first duration is equal to 4 μs for said first path, p1, and for said second path, p2, and said second duration differs between said first path and said second path, so that $(T_s/T_u)_{p1} = c^*(T_s/T_u)_{p2}$, where c is a parameter.

17. The method according to claim 14, wherein said parameter is received inside preamble symbols of said OFDM signal.

* * * * *